(12) United States Patent
Barkan

(10) Patent No.: US 7,497,383 B2
(45) Date of Patent: Mar. 3, 2009

(54) RESISTING CONDENSATION FORMATION IN ELECTRO-OPTICAL READERS

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 390 days.

(21) Appl. No.: 11/212,865

(22) Filed: Aug. 26, 2005

(65) Prior Publication Data

US 2007/0246540 A1    Oct. 25, 2007

(51) Int. Cl.
    *G06K 7/10*    (2006.01)
(52) U.S. Cl. .............................. 235/472.01; 235/462.45; 235/472.02
(58) Field of Classification Search ............. 235/472.01
See application file for complete search history.

(56) References Cited

U.S. PATENT DOCUMENTS

| | | | |
|---|---|---|---|
| 5,729,003 A * | 3/1998 | Briggs, III | 235/462.07 |
| 6,321,990 B1 * | 11/2001 | Giordano et al. | 235/472.01 |
| 2002/0017567 A1 * | 2/2002 | Connolly et al. | 235/472.02 |
| 2004/0212861 A1 * | 10/2004 | Gagne et al. | 359/196 |

FOREIGN PATENT DOCUMENTS

JP    07277698 A  * 10/1995

* cited by examiner

*Primary Examiner*—Michael G Lee
*Assistant Examiner*—Ali Sharifzada
(74) *Attorney, Agent, or Firm*—Kirschstein, et al.

(57) ABSTRACT

A heater is provided in a cordless reader, or in a cradle, for heating the reader simultaneously with charging a battery pack on the reader, to resist the formation of condensation in the reader, or fogging or frosting of a protective window of the reader.

15 Claims, 3 Drawing Sheets

RESISTING CONDENSATION FORMATION IN ELECTRO-OPTICAL READERS

BACKGROUND OF THE INVENTION

1. Field of the Invention

The present invention generally relates to electro-optical readers, such as scanners and imagers, for reading codes and, more particularly, to a cordless reader which can operate when moved between cold and warm environments without performance degradation due to condensation, fogging and frost, especially formed on a protective window on the cordless reader.

2. Description of the Related Art

Electro-optical readers, such as bar code symbol scanners and solid state imagers, have found wide acceptance in retail, wholesale, industrial and military applications. The scanner typically illuminates a symbol comprised of regions of different light reflectivity, senses light of different intensity scattered from the symbol regions, and determines widths and spacings of the symbol regions to derive information encoded in the symbol. The imager determines the widths and spacings of the symbol regions by capturing and processing an image of the symbol. In both types of readers, light passes through a protective window.

Under certain operating conditions, the window can become fogged, or even frosted, and condensation can form not only on the window, but also on the internal electro-optical components of the reader. A cordless reader is often used within indoor refrigerated environments, such as a commercial freezer or a non-heated warehouse, or in outdoor cold environments, such as a ski resort or an oil rig. Condensation forms due to vaporized water droplets in the ambient air within the reader when the reader is moved from such a cold environment into a warm environment. Condensation on the interior surface of the window cannot be wiped away. Light passing through condensation on the window can disable the reader by altering the light. Condensation on the interior optical components likewise alters the light. Condensation on the interior electrical components can cause short circuits and catastrophic failure of the reader. Frost can occur when the reader remains in a cold environment.

The prior art has proposed, for example, in U.S. Pat. No. 5,508,505, a heated chamber in which a scanner is housed until its removal prior to reading a symbol. The art has also proposed, for example, in U.S. Pat. Nos. 5,729,003 and 6,612,493, mounting a heater inside a scanner. The heater includes a resistive element that draws a large quantity of electrical current. If the electrical current is supplied by a power source on the scanner, then the power source is rapidly depleted and must be frequently renewed. If the electrical current is supplied by a power source external to the scanner, then an electrical power cable must be connected between the external power source and the scanner. However, the permanent connection of a power cable is disadvantageous for those applications where full freedom of portability for the scanner is desired.

SUMMARY OF THE INVENTION

Objects of the Invention

Accordingly, it is a general object of this invention to reliably operate a cordless reader in both cold and hot environments without degradation in reader performance due to condensation, fogging or frost.

More particularly, it is an object of the present invention to resist the formation of condensation on a protective window of a cordless reader, or on any of the electro-optical components within the cordless reader, when the cordless reader is moved from a cold to a warm environment.

Still another object of the present invention is to enable a cordless reader to operate under full power even in a cold environment.

Features of the Invention

In keeping with the above objects and others which will become apparent hereinafter, one feature of the present invention resides, briefly stated, in an arrangement for, and a method of, electro-optically reading indicia, such as bar code symbols, in environments of different temperatures. The arrangement includes a portable reader, e.g., a scanner or an imager, for electro-optically reading the indicia when the reader is held by an operator, and a base station for receiving the reader when the latter is not held by the operator.

The reader is cordless, that is, there is no electrical cable electrically connected thereto. There are no power wires for bringing electrical power into the reader. There are no communication wires for transmitting data to and from the reader. Instead, the cordless reader has a rechargeable battery pack which is charged by a battery charger in the base station when the reader is received in the base station. Also, the cordless reader preferably has a reader transceiver which is in wireless communication, for example, by radio frequency, with a station transceiver in the base station for bidirectionally transmitting and receiving data between the reader and the base station. A main electrical power supply is connected to the base station for supplying electrical power to the battery charger and the station transceiver.

In accordance with this invention, a heater is mounted in one of the reader and the base station. The heater is supplied with electrical power from the main power supply. The heating of the cordless reader is performed simultaneously with the charging of the battery pack when the reader is received in the base station. This heating resists the formation of condensation and fogging in the cordless reader when the latter is moved from a cold environment to a warm environment, and the formation of frost when the cordless reader is operated in a cold environment.

The cordless scanner is typically received in its base station where it is simultaneously charged and heated. There is no depletion of an on-board battery pack, because the on-board battery pack is being recharged. To initiate reading, the heated scanner is removed from the base station and operated to read one or more indicia before being returned to the base station for further charging and heating. The heated scanner not only avoids condensation, but also keeps the battery pack warm to increase its maximum battery capacity. Most battery packs lose capacity when cold, thereby reducing how long the battery pack will last when the reader is used in a cold environment.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
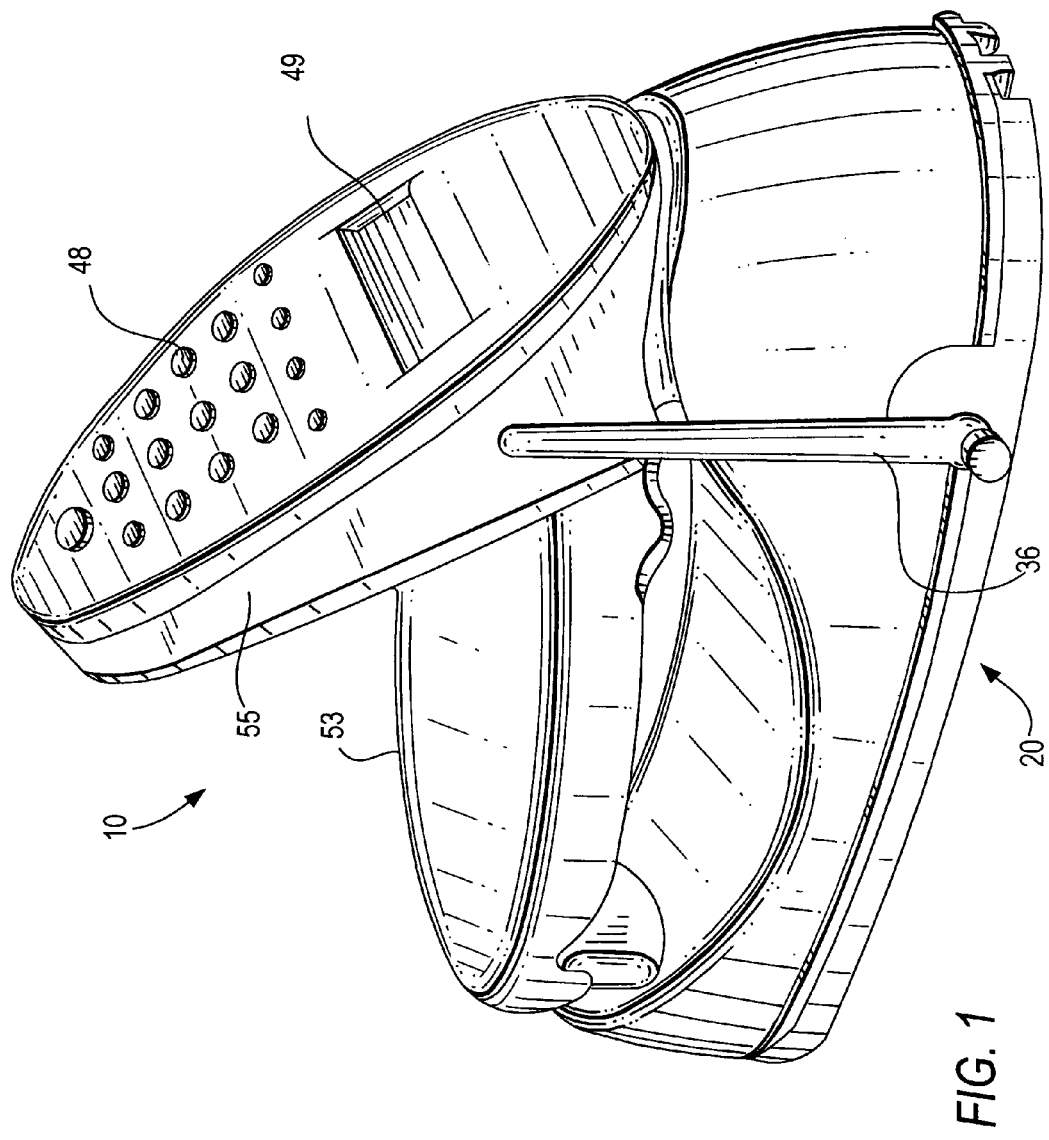
FIG. 1 is a perspective view of an arrangement including a cordless reader received in a base station for simultaneous charging and heating in accordance with this invention.

Referring now to the drawings, reference numeral 10 in FIG. 1 generally identifies a portable, cordless reader for electro-optically reading indicia such as bar code symbols, and reference numeral 20 in FIG. 1 generally identifies a cradle or base station for receiving the reader 10.

Figure 2:
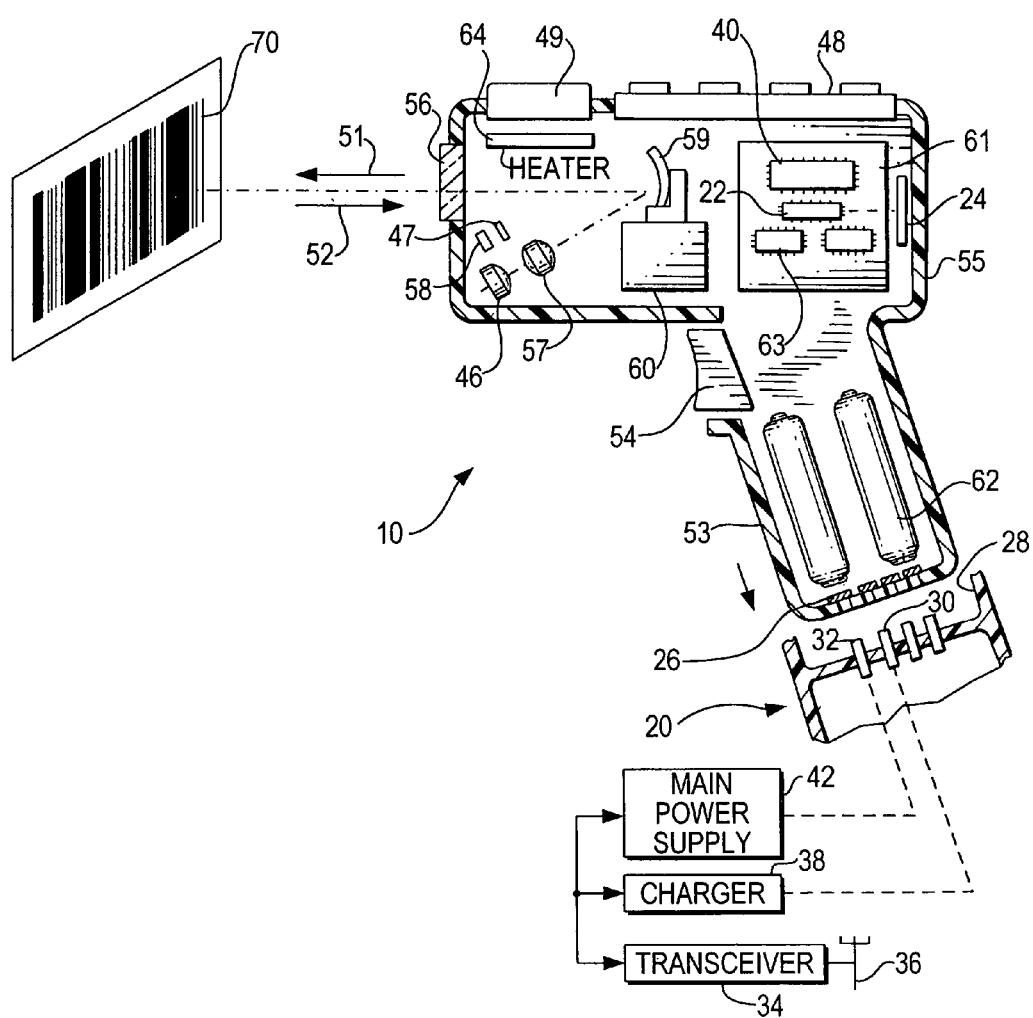
FIG. 2 is a diagrammatic view of one embodiment of the arrangement of FIG. 1.
Figure 3:
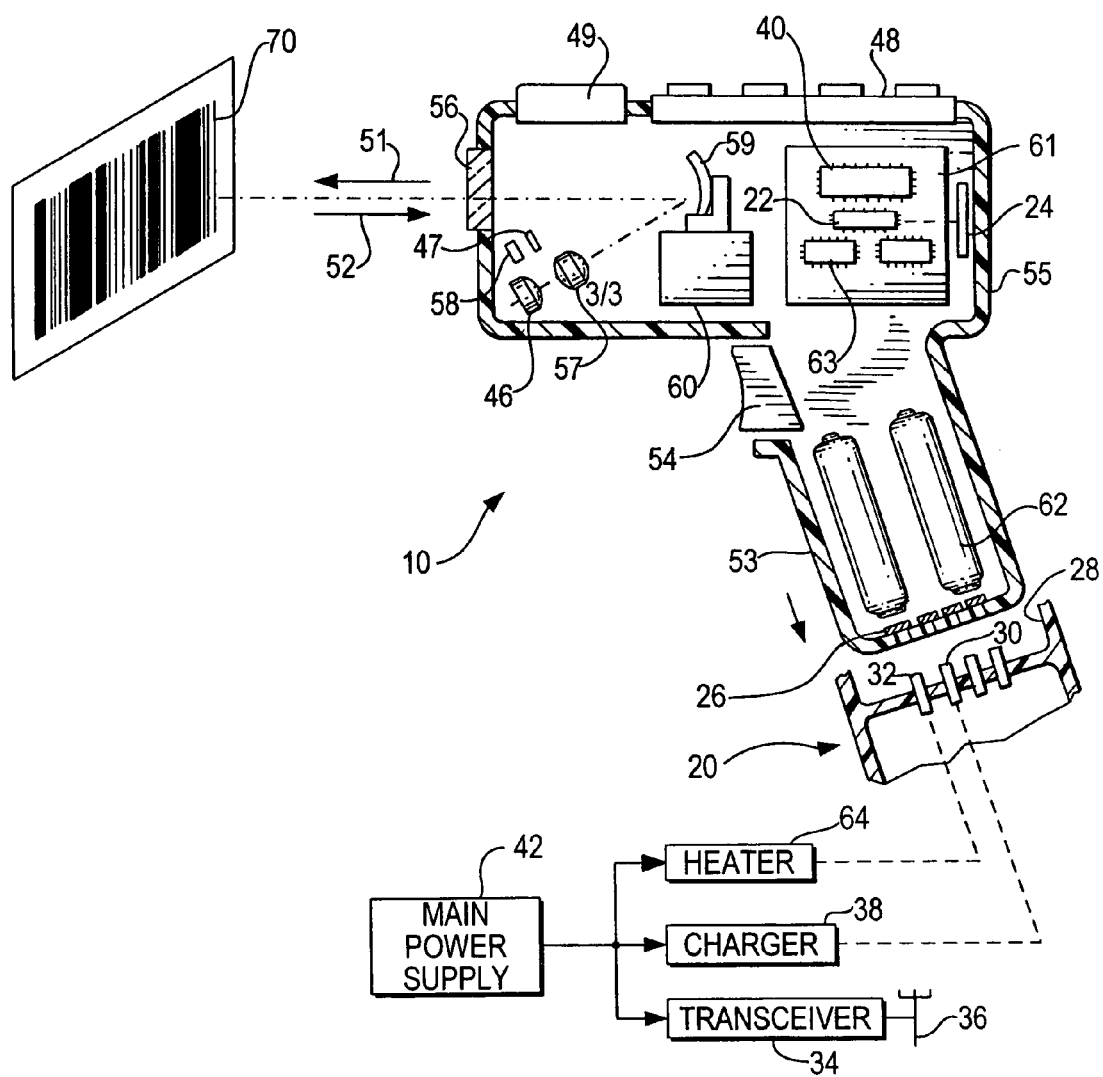
FIG. 3 is a diagrammatic view of another embodiment of the arrangement of FIG. 1.

As better shown in FIGS. 2-3, the reader 10 is preferably implemented as a gun shaped device, having a pistol-grip handle 53. A lightweight plastic housing 55 contains a light source 46, a detector 58, optics 57, signal processing circuitry 63, a programmed microprocessor 40, and a power source or battery pack 62. An exit window 56 at a front end of the housing 55 allows an outgoing light beam 51 to exit and incoming reflected light 52 to enter. A user aims the reader at a bar code symbol 70 from a position in which the reader 10 is spaced from the symbol, i.e., not touching the symbol or moving across the symbol.

The optics 57 may include a suitable lens (or multiple lens system) to focus the light beam 51 into a scanning spot at an appropriate reference plane. The light source 46, such as a semiconductor laser diode, introduces a light beam into an optical axis of the lens 57, and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern, such as a scan line or a raster pattern of scan lines, across the symbol.

The light 52 reflected or scattered back by the symbol 70 passes back through the window 56 for transmission to the detector 58. In the exemplary reader shown in FIG. 1, the reflected light reflects off the mirror 59, passes through an optical filter 47 and impinges on the light sensitive detector 58. The filter 47 is typically designed to have a bandpass characteristic in order to pass the reflected (return) laser light and block the light coming from other optical sources. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars of the symbol. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates the movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible light spot which may be fixed, or scanned just like the laser beam 51. The user employs this visible light to aim the reader at the symbol before pulling the trigger.

The reader 10 may also function as a portable data collection terminal. If so, the reader would include a keyboard 48 and a display 49.

As previously mentioned, the reader 10 is cordless. Preferably, a reader transceiver 22 is mounted on the circuit board 61 and is coupled to an antenna 24 for transmitting and receiving data from and to the reader 10. The battery pack 62 is rechargeable. There is no cable connected to the reader that has power wires for supplying electrical power, or communication wires for transmitting or receiving data. At a lower end of the handle 53, a plurality of contacts 26 is provided for mating engagement with corresponding contacts in the cradle, as described below.

The cradle 20, as shown in FIG. 1, receives the reader 10 when the reader is not being held by the user. The cradle 20 has a compartment 28 (see FIGS. 2-3) into which a lower end region of the handle 53 is received. A plurality of contacts, including a charger contact 30 and a heater contact 32, is provided in the compartment 28 for making electromechanical contact with respective ones of the contacts 26 provided at the lower end region of the handle when the reader is mounted in the cradle.

The cradle 20 preferably includes a station transceiver 34 coupled to a station antenna 36 for transmitting and receiving data to and from the reader transceiver 22 and the reader antenna 24, over a wireless link, preferably at radio frequency. The cradle 20 further includes a battery charger 38 operatively connected to the charger contact 30 for charging the battery pack 62 when the reader is mounted in the cradle. A main electrical power supply 42 is connected to the cradle for supplying electrical power to the battery charger 38 and the station transceiver 34.

In accordance with this invention, a heater 64 is mounted in the reader 10 (see FIG. 2), or in the cradle (see FIG. 3) and is supplied with electrical power from the main power supply 42. In the FIG. 2 embodiment, the main power supply 42 is operatively connected via the heater contact 32 to the heater 64 which, in turn, heats the interior of the reader. In the FIG. 3 embodiment, the main power supply 42 is connected to the heater 64 which, in turn, generates heat conducted via heater contact 32 to the interior of the reader. In both embodiments, electrical energy for heater 64 is not derived from the battery pack 62, thereby allowing the battery pack to perform its function of supplying electrical power to the electrical components within the reader without having to waste its stored energy by supplying power to the heater.

The heating of the reader occurs simultaneously with the charging of the battery pack 62. No longer does the user have to decide whether to charge or heat the reader. More particularly, if the user opts to charge a prior art reader, then condensation can form if the reader is moved from a cold to a warm environment. Likewise, if the user opts to heat a prior art reader, then the heating drains the on-board battery pack, thereby requiring frequent recharging.

In accordance with this invention, the on-board battery pack is recharged at the same time as the reader is heated, thereby enabling a fully charged and heated reader to be always ready for use even when moved from a cold to a warm environment. In addition, the warming of the interior of the reader also warms the battery pack, thereby increasing its maximum battery capacity. Most battery packs lose capacity when cold, thereby reducing how long the battery pack will last when the reader is used in a cold environment.

It is preferable, as shown in FIG. 2, if the heater 64 is located in proximity to the window 56 since the window typically has the lowest thermal isolation factor and is typically the first component on which condensation is likely to form. The heater 64 typically includes a resistive strip which may, in some applications, take the form of an optically transparent conductive film deposited on the window. The film and, of course, the entire heater 64 must be positioned so as to avoid interference with the outgoing beam 51 or the return light 52. The heater may include a recirculating fan to force the air within the reader to flow over the resistive strip and to be blown over all the electro-optical components within the reader. The heater may further include a temperature sensor, such as a thermal zener diode, for turning on the resistive strip when the temperature within the reader reaches a certain threshold.

The cradle 20 may be fixed in position, or as is common, may be mounted on a forklift which is employed to transport goods bearing indicia in and out of freezers or refrigerators in which the goods are stored in warehousing applications. A typical forklift battery can constitute the main power supply 42. The load introduced by heater 64 is not a significant power burden on the forklift battery which is capable of supplying much larger amounts of current, for example, for operating the forklift.

The heated, cordless scanner of this invention may be operated uninterruptedly in accordance with this invention during transitions between extreme thermal environments while resisting, if not eliminating, formation of condensation in the cordless reader, as well as fogging or frosting of the protective window of the reader.

It will be understood that each of the elements described above, or two or more together, also may find a useful application in other types of constructions differing from the types described above.

For example, it is not necessary for the wireless communication between the reader and the base station to rely on radio transceivers. An optical link using infrared light can be used. Alternatively, the reader can store data in an on-board memory and thereafter transmit the stored data via electrical contacts when the reader is mounted in the base station.

In the FIG. 3 embodiment, which is currently preferred over the FIG. 2 embodiment, the heater 64 in the base station can be constantly powered to keep the inside of the compartment, into which the front end region of the reader is placed, warm all the time. Alternatively, the heater 64 in the base station can be powered only when the reader is mounted in the base station.

While the invention has been illustrated and described as embodied in resisting condensation formation in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for electro-optically reading indicia in environments of different temperatures, comprising:
    a portable, cordless reader for electro-optically reading the indicia when the cordless reader is held by an operator, the cordless reader having a rechargeable battery pack and a plurality of reader contacts;
    a base station for receiving the cordless reader when the cordless reader is not held by the operator, the base station having a battery charger, a charger contact and a heater contact, the battery charger being operative for charging the battery pack when the charger contact engages one of the reader contacts when the cordless reader is received in the base station;
    a main electrical power supply connected to the base station for supplying electrical power to the battery charger; and
    a heater mounted in one of the reader and the base station and supplied with electrical power from the main power supply, for heating the cordless reader simultaneously with the charging of the battery pack when the heater contact simultaneously engages another of the reader contacts when the cordless reader is received in the base station, to resist condensation formation in the cordless reader when the cordless reader is operated in one of the environments of different temperatures.

2. The arrangement of claim 1, wherein the cordless reader includes a window and a scanner for sweeping a light beam through the window to the indicia for reflection therefrom.

3. The arrangement of claim 2, wherein the heater is mounted in proximity to the window.

4. The arrangement of claim 1, wherein the cordless reader has a reader transceiver, and wherein the base station has a station transceiver in wireless communication with the reader transceiver.

5. The arrangement of claim 1, wherein the cordless reader includes a keyboard for manually entering data, and a display for displaying information.

6. The arrangement of claim 1, wherein the heater is mounted in the base station.

7. The arrangement of claim 6, wherein the heater is constantly powered.

8. The arrangement of claim 6, wherein the heater is only powered when the reader is mounted in the base station.

9. A method of electro-optically reading indicia in environments of different temperatures, comprising the steps of:
    electro-optically reading the indicia by operating a portable, cordless reader held by an operator;
    providing the reader with a plurality of reader contacts;
    receiving the cordless reader in a base station when the cordless reader is not held by the operator;
    providing the base station with a battery charger contact and a heater contact;

charging a battery pack in the cordless reader when the charger contact engages one of the reader contacts when the cordless reader is received in the base station;

supplying electrical power to the base station to enable the charging step to be performed; and heating the cordless reader simultaneously with the charging of the battery pack when the heater contact simultaneously engages another of the reader contacts when the cordless reader is received in the base station, to resist condensation formation in the cordless reader when the cordless reader is operated in one of the environments of different temperatures.

10. The method of claim 9, wherein the heating step is performed by mounting a heater in one of the cordless reader and the base station.

11. The method of claim 10, wherein the mounting step is performed by mounting the heater in proximity to a window of the cordless reader.

12. The method of claim 10, wherein the mounting step is performed by mounting the heater in the base station.

13. The method of claim 12, wherein the heating step is performed constantly.

14. The method of claim 12, wherein the heating step is performed only when the cordless reader is received in the base station.

15. The method of claim 9, and the step of establishing wireless communication between the cordless reader and the base station.

* * * * *